UNITED STATES PATENT OFFICE.

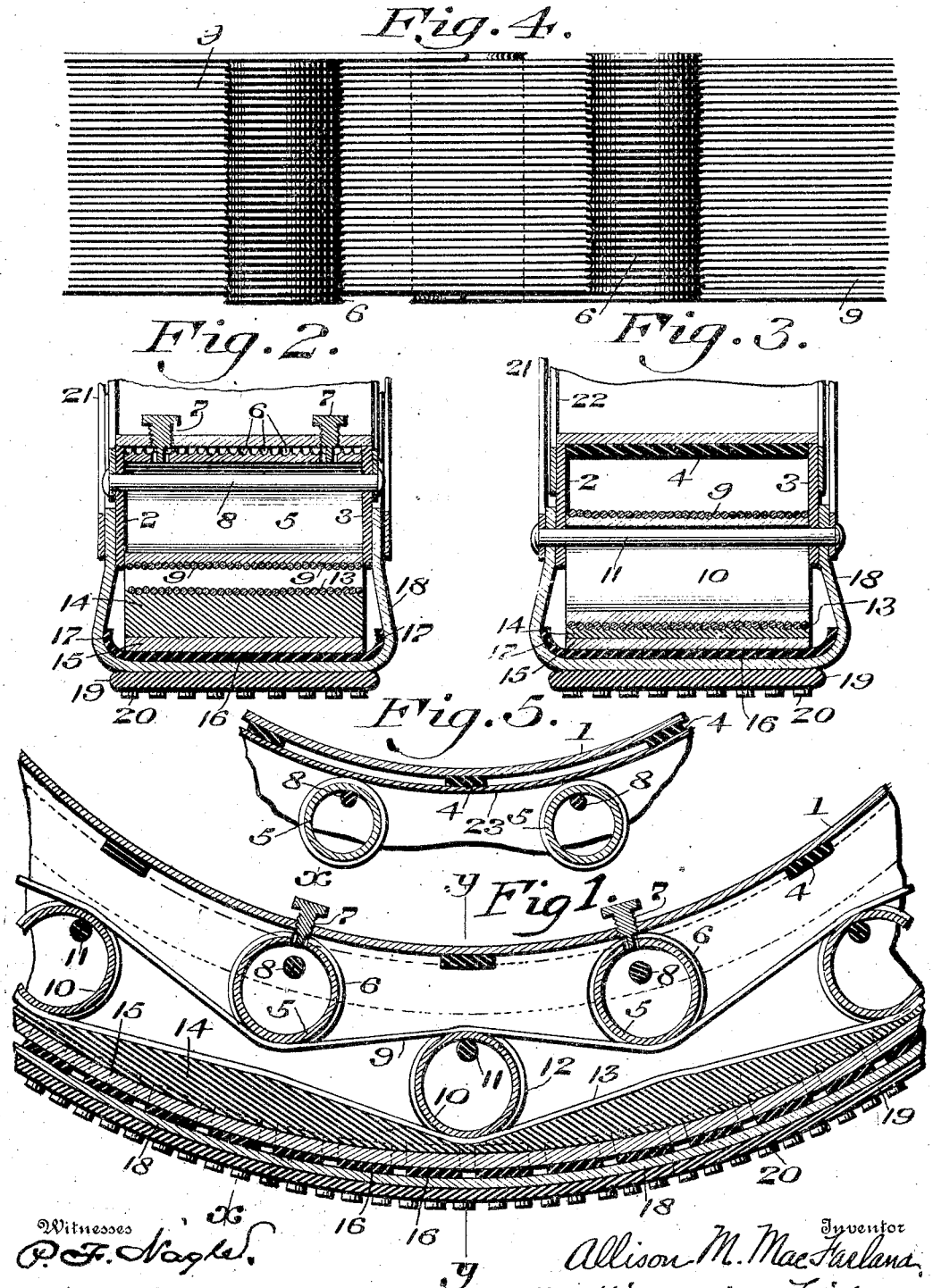

ALLISON M. MacFARLAND, OF PHILADELPHIA, PENNSYLVANIA, ASSIGNOR, BY DIRECT AND MESNE ASSIGNMENTS, OF FIFTEEN ONE-HUNDREDTHS TO WILLIAM W. GIBBS, ONE ONE-HUNDREDTH TO CHARLES H. HEUSTIS, AND THREE ONE-HUNDREDTHS TO WILLIAM W. WEIGLEY, ALL OF PHILADELPHIA, PENNSYLVANIA, AND SIXTY-FOUR ONE-HUNDREDTHS TO WILLIAM C. L. EGLIN AND JOSEPH B. McCALL.

VEHICLE-TIRE.

No. 923,059.  Specification of Letters Patent.  Patented May 25, 1909.

Application filed July 11, 1908. Serial No. 443,048.

*To all whom it may concern:*

Be it known that I, ALLISON M. MACFARLAND, a citizen of the United States, residing in the city and county of Philadelphia, State of Pennsylvania, have invented a new and useful Vehicle-Tire, of which the following is a specification.

My invention relates to a new and useful vehicle tire in which resiliency is obtained by a suspended member supported at suitable points around the tire.

It further consists of a suspended member suitably supported at intervals around the tire, said member forming the support for a second member which supports the tread of the tire.

It further consists of means for adjusting the tension of the suspended member.

It further consists of new and novel supports for the suspended member and the tread.

It further consists of novel details of construction, all as will be hereinafter fully set forth.

Figure 1 represents a vertical sectional view of a portion of a vehicle tire embodying my invention. Fig. 2 represents a sectional view on line $x$—$x$ Fig. 1. Fig. 3 represents a sectional view on line $y$—$y$ Fig. 1. Fig. 4 represents a plan view of a portion of the suspended member showing three of the supports. Fig. 5 represents a sectional view of a portion of the vehicle tire showing a slightly different construction from that shown in the other figures.

Similar numerals of reference indicate corresponding parts in the figures.

Referring to the drawings. My invention consists of a new form of resilient vehicle tire in which the resiliency is obtained by tightly stretching a suspending member, between points of support, the load being applied between the supports. In the form of construction herein shown and described, a steel wire or cable is employed, points of support of suitable construction being located at intervals around the wheel and the wire or cable being tightly drawn over them, the portion of the tightly drawn wire between the supports, possessing resilience of high degree, due to the elasticity of the wire which, though slight in a short section, is sufficient for the purpose in a wheel of ordinary circumference. In case the elasticity of the suspending medium is not sufficient to permit the desired deflection, additional resilience may be secured by providing a slight spring effect in the points of support.

The supports may be provided with means for adjustment, as desired, to increase or adjust the tension on the cables or suspending members or to take up any slack due to stretching of the same. As it is necessary in a rotating wheel to provide a continuous resilient surface and as the above described construction only provides a resilient surface between the points of support, I have in the described instance used two series of suspending cables, the points of support for the outer series being superimposed on the inner suspending cables at points substantially midway between the supports of the inner cable. By these means a continuous resilient circumference is provided, it being noted that both the points of support and the intermediate portion of the outer cables will possess the same resilient qualities.

In order that the resistance to deflection may be the same at all points on the circumference and also that the circumference may be in the form of a true circumference, pads of suitable material are provided to round out the portions of the outer circumference between the points of support. Outside of these pads is located the casing or tread of the tire, covering all and making a smooth continuous surface. In the construction described the traction of the wheel is transferred to the road by means of a leather cover but, as explained elsewhere, this is not necessary in all cases.

In the drawings, I have shown a construction which I have found in practice operates successfully but it will be evident that the parts may be varied, the arrangement of the same may be altered and other instrumentalities may be employed, which will come within the scope of the invention and I do not therefore desire to be limited in every instance to the exact form as herein shown and described but desire to make such changes as may be necessary.

1 designates a rim formed of suitable material, preferably steel, and which is secured to the rim of the wheel in any suitable or desired manner. Projecting from the rim are the flanges or sides 2 and 3 which are preferably of steel and which can be made integral with the rim 1 or secured thereto, in any desired manner. At intervals around the rim I provide cleats 4 which are riveted or otherwise secured to the said rim 1 and which serve to hold the sides 2 and 3 in proper position. Between the sides 2 and 3 and adjacent the rim 1, I place supports for the suspended member, which supports, in the present instance, consist of rollers 5 which are preferably provided with the grooves or serrations 6 in their faces and which rollers are provided with set-screws 7 which pass through the steel rim 1 and are preferably in threaded engagement therewith, so that by the rotation of the set screws the position of the rollers 2 can be adjusted with respect to the rim for the effect of tightening or adjusting the tension of this suspended medium, as will be hereinafter described.

8 designates bolts which pass through the sides 2 and 3 and through the rollers 5 and will assist in preventing improper movement of the rollers.

9 designates a suspended member which in the present instance consists of a plurality of wire ropes or cables which are seated in the grooves 6 in the rollers 5, and as these cables are continuous and tightly drawn around the tire they hold the rollers 5 against the rim 1, said rollers serving as the supports for the cables or wire ropes so that the portion thereof between the support will be resilient. By adjusting the position of the rollers to or away from the steel rim 1 the tension of the cables will be correspondingly adjusted.

10 designates a second series of rollers situated between the sides 2 and 3 and passing through which are the bolts 11 which serve to hold the said rollers 10 in position, it being noted that one of each of said rollers 10 and said bolts 11 is situated substantially midway between two adjacent rollers 5 and that the said rollers 10 bear upon the cable or suspended member 9 at this point so that said rollers 10 are resiliently supported by said suspended member 9, it being understood that the bolt 11 while permitting rocking movement of the rollers prevents improper movement thereof and that said rollers are preferably provided with grooves 12 upon their outer faces in which are adapted to be seated or received a second suspended member formed of a series or plurality of ropes or cables 13, it being understood that these cables are thus suspended at intervals around the entire circumference of the tire.

As will be clearly understood from Fig. 1 by reason of the spaces between the rollers 10, the cables 13 will be straight or substantially so, therebetween, and in order to provide a properly rounded tread for the tire, I provide a leather pad 14 which is superimposed upon the cable 13, and upon the outer surface of the pad, I provide a leather band 15 and at intervals thereon with suitable spaces therebetween are placed the metal cleats 16 which are provided with the flanged edges 17.

18 designates a casing which surrounds the parts just described, the edges of which extend upon preferably the outer side of the sides 2 and 3 and are held in position by bolts 11, as shown in the drawings, although it will be understood that if desired other provisions may be made. It will be understood therefore that I do not desire to be limited in the particular manner of securing the casing to the sides, but that any desired means may be employed for this purpose, it being noted that in Figs. 2 and 3, metal cleats 2 and 3 hold the casing in proper position and it being further understood that I preferably form this casing of leather. Upon the exterior of the casing I mount a band 19 which is preferably of leather provided with metal studs 20 projecting from the face thereof which serve as the tread for the tire, and furnishes a surface for the traction which may be applied to the road bed, the metal studs or buttons giving a metal wear-resisting surface.

In order to accommodate the heads of the bolts 8 and 11, I have shown the metal rings or washers 21 and 22 for this purpose. In the construction shown in Fig. 5, I have provided a steel spring rim 23 between the rollers 5 and the rim 1, which spring rim furnishes a further resilient support for the rollers 5, as will be evident. The rollers 5 and 10 may be retained in position and their travel limited by any suitable means and the said rollers may be made of thin section to provide a certain amount of spring or resiliency in themselves which may be utilized if desired to add to the resiliency of the cables. It is understood that the ends of the cables are connected in any suitable or desired manner to make a continuous cable. I desire it understood that I do not limit myself to the exact form of construction herein set forth but wish to emphasize and call attention to the fact that the underlying principle of this invention consists of employing a tightly drawn suspending member or medium which may consist of steel wires or cables or other suitable form of suspending medium tightly drawn over points of support. The form of casing or tread employed may vary to suit conditions and may consist of any desired or well known form of construction employing any of the materials used for such purpose, provided that the resilient feature is arranged by tightly drawn suspended cables or other from of suspended medium. Also details may be varied such as employing or not employing various devices to regulate the tension of the cables or to add to their resistance when necessary or to provide means for attaching the ends of such cables, etc.

Having thus described my invention, what I claim as new and desire to secure by Letters Patent, is:—

1. In a vehicle tire, alternately disposed rollers, suspended members engaged with said rollers, and means for bodily adjusting one set of rollers to vary the tension of the suspended members.

2. In a vehicle tire, a plurality of sets of suspended members, supports therefor in sets, one set upon the inner side of one of the suspended members and the other set upon the other side thereof and between the two and means for independent adjustment of each support in one of said sets.

3. In a vehicle tire, a suspended member, rocking supports for said member situated at intervals around said tire, eccentrically disposed means for holding said supports against displacement and means for bodily adjusting said supports.

4. In a vehicle tire, a suspended member, supports therefor situated at intervals around the tire, means acting directly on said supports for independent adjustment thereof with relation to said member, a second suspended member, supports therefor bearing upon said first-mentioned member between the supports thereof, and means for holding the parts in proper position.

5. In a vehicle tire, a suspended member, supports therefor situated at intervals around the tire, means acting directly on said supports for independent adjustment thereof with relation to said member, a second suspended member, supports therefor bearing upon said first-mentioned member between the supports thereof, means for holding the parts in proper position, a casing surrounding the parts and a yieldable support for the second suspended member between the latter and said casing.

6. In a vehicle tire, a suspended member, adjustable supports therefor, situated at intervals around the tire, a second suspended member, supports therefor bearing upon said first mentioned member between the supports thereof, means for holding the parts in proper position, and a pad superimposed on said second mentioned suspended member.

7. In a vehicle tire, a suspended member, supports therefor situated at intervals around the tire, a second suspended member, supports therefor, bearing upon said first mentioned member between the supports thereof, means for holding the parts in proper position, a pad carried by said second mentioned member, cleats on said pad and a casing for holding the parts in proper position.

8. In a vehicle tire, a plurality of rollers suitably supported at intervals around the tire, cables supported by said rollers, a plurality of rollers supported by said cables at points between the first mentioned rollers, cables supported by said second-mentioned rollers, said cables being oppositely inclined between the rollers of the opposed sets, and pads in said last mentioned cables and fitted in the inclined spaces between the cable and the casing.

9. In a vehicle tire, a plurality of rollers suitably supported at intervals around the tire, cables supported by said rollers, a plurality of rollers supported by said cables at points between the first mentioned rollers, cables supported by said second mentioned rollers, pads on said last-mentioned cables, said cables being oppositely inclined between the rollers of said sets, and a casing for holding the parts in position, said pads conforming to the inclination of the cable between each set of rollers.

10. In a vehicle tire, a plurality of rollers suitably supported at intervals around the tire, cables supported by said rollers, a plurality of rollers supported by said cables at points between the first mentioned rollers, cables supported by said second mentioned rollers, pads on said last mentioned cables, cleats supported by said pads, a casing for holding the parts in position and a suitable tread for the tire.

11. In a vehicle tire, a rim having sides, rollers mounted between said sides, means in said rim for adjusting the rollers, means parallel with the axes of the rollers eccentrically of the axes thereof for holding the rollers against improper movement, a suspended member engaged by said rollers, a second set of rollers, means disposed eccentrically with relation to the axes thereof and supported in said sides for holding said rollers against improper movement and allowing them to rock, and a second suspended member engaged by the last mentioned rollers.

ALLISON M. MacFARLAND.

Witnesses:
WM. CANER WIEDERSEIM,
C. D. McVAY.